United States Patent [19]

Hogan et al.

[11] Patent Number: 4,522,987

[45] Date of Patent: Jun. 11, 1985

[54] LOW DENSITY POLYETHYLENE

[75] Inventors: John P. Hogan; Eric T. Hsieh; James C. Randall, all of Bartlesville, Okla.

[73] Assignee: Phillips Petroleum Company, Bartlesville, Okla.

[21] Appl. No.: 396,930

[22] Filed: Jul. 9, 1982

[51] Int. Cl.[3] .................. C08F 2/34; C08F 210/16
[52] U.S. Cl. ................... 526/106; 526/348.2; 526/348.4; 526/348.5; 526/348.6; 526/901
[58] Field of Search ................ 526/106, 348.5

[56] References Cited

U.S. PATENT DOCUMENTS

| 2,929,807 | 3/1960 | Leatherman et al. | 526/106 |
| 3,666,736 | 5/1972 | Hogan | 526/106 |
| 3,803,106 | 4/1974 | Hayashi et al. | 526/339 |
| 3,887,494 | 6/1975 | Dietz | 526/106 |
| 3,947,433 | 3/1976 | Witt | 526/105 |
| 4,011,382 | 3/1977 | Levine et al. | 526/106 |
| 4,101,445 | 7/1978 | Levine et al. | 526/106 |
| 4,101,722 | 7/1978 | Hogan et al. | 526/348.5 |
| 4,182,815 | 1/1980 | McDaniel et al. | 526/348.5 |
| 4,255,542 | 3/1981 | Brown et al. | 526/106 |
| 4,293,673 | 10/1981 | Hamer et al. | 526/348.6 |
| 4,303,770 | 12/1981 | Pullukat et al. | 526/106 |

FOREIGN PATENT DOCUMENTS 0007647 2/1980 European Pat. Off. ......... 526/348.6

Primary Examiner—Edward J. Smith

[57] ABSTRACT

A process for copolymerizing ethylene with another monoolefin is described wherein the other monoolefin is incorporated into the polymer at very high efficiencies and in several instances the copolymer produced contains a higher concentration of the comonomer than the gas phase in the polymerization zone. A novel ethylene/1-hexene copolymer having very high relative comonomer dispersities (99% or higher, and even above 100%) is also described.

8 Claims, No Drawings

LOW DENSITY POLYETHYLENE

This invention relates to a process to produce copolymers of ethylene and a minor amount of other 1-olefins. Another aspect of this invention relates to novel ethylene/1-hexene copolymers.

BACKGROUND OF THE INVENTION

Polyethylene is commercially produced in a variety of ways. Catalysts based on chromium and related polymerization processes are described in U.S. Pat. No. 2,825,721. The chromium catalysts and the corresponding polymerization processes have wide spread acceptance in the polymerization and copolymerization of ethylene. Slurry processes in which the catalyst, the monomer or monomers and a diluent are subjected to polymerization conditions for the monomers are known in the art.

Many homopolymers of ethylene and copolymers of ethylene and other olefins have been described, produced and sold. In recent years, so called linear low density polyethylenes have been marketed. While the original low density polyethylenes were characterized by long chain branching as well as short chain branches and thus were not linear, the modern low density polyethylenes are linear polymers, i.e. they have essentially no long chain branching but contain short chain branching introduced into the molecule by a comonomer such as 1-butene which produces ethyl branches. The quantity and kind of such short side chains have influence on the physical properties of the polymers produced.

One process for the production of linear low density polyethylene is through copolymerization of ethylene and other 1-olefins such as 1-butene in a gas phase polymerization utilizing a catalyst which comprises a silica support containing chromium, titanium and fluorine deposited thereon as described in U.S. Pat. No. 4,011,382. 1-hexene is mentioned in this patent as a possible comonomer. Efficient production of linear low density polyethylene and improving the respective processes are remaining goals in the industry.

THE INVENTION

It is one object of this invention to provide a new process for the production of polyethylene.

Another object of this invention is to provide a process which allows a high efficiency of comonomer incorporation into the chain for the polymerization of ethylene.

A still further object of this invention is to provide a highly efficient process for ethylene polymerization.

Yet another object of this invention is to provide a process for ethylene polymerization in which a significant amount of the polymerization reaction cooling is achieved by using a cold feedstream.

A yet further object of this invention is to provide a new ethylene/1-hexene copolymer.

These and other objects, details, features, embodiments and advantages of this invention will be become apparent to those skilled in the art from the following detailed description and appended claims.

In accordance with this invention it has been found that a gas phase polymerization of ethylene in contact with a catalyst based on coprecipitated silica and titania and which also contains chromium constitutes an unusual process with unique and unexpected features.

Surprisingly, it has been found that the process described herein allows the incorporation of comonomer in the polymer chain in a "super-random" fashion, in which the comonomer units are very well isolated by ethylene units in the polymer chain. It has also been found that it is possible to incorporate higher concentrations of 1-olefin comonomers into the polymer chain of ethylene units in even higher concentrations than that of the comonomer in the gas phase of the polymerization zone. This latter observation is a particularly surprising feature and is of significance for commercial application of the process because 1-olefin comonomers normally require a higher feed temperature to prevent their condensation. On the other hand, a low feed temperature is desirable to provide cooling of the polymerization reaction.

The process of this invention allows one the use of low concentrations of the conomoner in the gas phase and thus to use cooler feedstreams, while at the same time a relatively high concentration of the comonomer in the copolymer is achieved.

Furthermore it has been discovered that the process of this invention produces copolymers of ethylene and other 1-olefins which contain the comonomer units separated from one another; the comonomer units are not to any significant extent present as clusters or blocks. In some instances the dispersity of the comonomer units in the polymer chain has been found to be higher than the ideally random distribution. This result is an entirely unexpected result.

Thus in accordance with a further embodiment of this invention a novel ethylene/1-hexene copolymer is provided. This copolymer is characterized by having a relative monomer dispersity of above 99%. Most preferably the copolymer has a relative comonomer dispersity of 100% or more.

THE POLYMERIZATION PROCESS

The process of this invention comprises as its main step a gas phase polymerization of ethylene. Preferably this step is a copolymerization of ethylene and one or more 1-olefin comonomers. The polymerization is carried out in contact with a catalyst containing cogelled silica and titania and further containing chromium. Such catalysts are described for instance in U.S. Pat. No. 3,887,494; the disclosure of this patent is herewith incorporated by reference. The catalyst used in this invention is either a silica/titania cogel containing chromium oxide or it is a silica/titania/chromium oxide tergel obtained by simultaneously gelling silica, titania and chromium oxide.

The catalyst used in the process of this invention can be characterized by the following ranges of properties or respective ingredients:

|  | Weight Percent | |
| --- | --- | --- |
|  | Generally | Preferred |
| Silica[1] | 80 to 99.8 | 90 to 98 |
| Titanium as titania (coprecipitated with silica)[1] | 1 to 10 | 2 to 5 |
| Chromium as chromium oxide (when deposited on the silica/titania cogel)[1] | 0.1 to 10 | 0.2 to 3 |
| Chromium as chromium oxide (when coprecipitated with silica and titania)[1] | 0.1 to 10 | 0.2 to 3 |
| Pore Volume[2] (cc/g) | 1.8 to 3.5 | 2.0 to 3.0 |
| Surface Area[3] (square meters per g) | 200 to 500 | 350 to 450 |

|  | Weight Percent | |
|---|---|---|
|  | Generally | Preferred |
| Particle Size[4] (microns) | 10 to 300 | 50 to 150 |

[1]Based on total weight of catalyst.
[2]Determined by nitrogen absorption.
[3]Determined by BET.
[4]Determined by screening.

The catalyst used in accordance with this invention is activated generally in the regular way chromium oxide catalysts are activated. The activation includes contacting the catalyst with free oxygen at high temperatures. Specifically activation temperatures range from 177° to 1093° C. Catalyst poisons or deactivators such as water or other hydroxyl containing compounds should be kept away from the activated catalyst. For this procedure, too, standard techniques such as a protection of the catalyst with nitrogen gas can be utilized. In the process of this invention the other 1-olefins used together with ethylene are also valuable in activating the catalyst and increasing the reaction rate. Thus the process of this invention actually involves two activation steps. The first activation step is the regular activation with high temperature and free oxygen. The second activation step is the initial contacting of the catalyst with the olefins which cause the activation of the catalyst and increase in the reaction rate. This step is then followed by polymerization.

It is within the scope of this invention to use a promoter or adjuvant. Examples of such adjuvants are trialkylaluminum, e.g. triethylaluminum, trialkylboranes, e.g., triethylborane, magnesium alkyls, e.g. dibutyl magnesium or mixtures thereof. Many of these adjuvants are known in the art as adjuvants for slurry and solution polymerizations of olefins. The adjuvant may be added by impregnating the catalyst with a solution of the adjuvant and evaporating the solvent. The impregnation can also be done in a fluidized bed by spraying the adjuvant solution onto the fluidized catalyst at a temperature preferably above the boiling point of the solvent. The adjuvant when used is added to the catalyst after the high temperature activation, generally at a temperature in the range of 50° to 200° C. The adjuvant is generally used in a concentration of 1 to 5 weight % based on total catalyst.

The monomer feedstreams used in the process of this invention are in gas phase and contain ethylene and the comonomer or comonomers. The comonomers are 1-olefins having 4 to 10 carbon atoms. The comonomers are employed in a ratio of ethylene:comonomer in a range of about 1000:1 to 11:1. In accordance with this invention it is possible to operate with relatively low concentrations of the comonomer in the gas phase surrounding the catalyst. Specifically, it is possible and presently preferred to use a molar concentration of comonomer which is in contact with the catalyst in the gas phase as defined by the following relationship:

$$CG = k \times CP$$

wherein

CG is the concentration of comonomer in the gas phase in the catalyst zone or reactor expressed as mole percent based on the total moles of olefins in that same zone as 100%

CP is the concentration of the comonomer units in the polymer chain based on total molar units of ethylene and comonomer units in the polymer as 100%.

k is a factor in the range of $\frac{1}{8}$ to 3/2.

In several circumstances it has been found in accordance with this invention that a higher comonomer concentration was achieved in the polymer than was present in the gas phase of the catalytic polymerization zone. This effect appears to be more pronounced with increasing molecular weight of the comonomer. Therefore, the lower end of the range for the factor k above is associated with higher molecular weight comonomers such as octenes, while the higher range for the factor k is associated with comonomers having a lower molecular weight, i.e. butenes and pentenes.

The concentration of the comonomer (mole % of all olefins) in the preferred process of this invention can be described for the individual comonomers in the gas phase of the polymerization zone relative to the concentration of this comonomer in the copolymer by the formulae:

$$CGB = \frac{CPB}{K4}$$

CGB = mole concentration 1-butene in gas phase.
CPB = mole concentration 1-butene in copolymer.

$$CGH = \frac{CPH}{K6}$$

CGH = mole concentration 1-hexene in gas phase.
CPH = mole concentration 1-hexene in copolymer.

$$CGO = \frac{CPO}{K8}$$

CGO = mole concentration 1-octene in gas phase.
CPO = mole concentration 1-octene in copolymer.

$$CGF = \frac{CPF}{K51}$$

CGF = mole concentration of 4-methyl-1-pentene in gas phase.
CPF = mole concentration of 4-methyl-1-pentene in copolymer.

and by the ranges for the respective factors K as follows:

| Comonomer | K | Range for the K-factors |
|---|---|---|
| 1-butene | K4 | 0.6 to 1.2 |
| 1-hexene | K6 | 1.4 to 2.5 |
| 1-octene | K8 | 4 to 7 |
| 4-methyl-1-pentene | K51 | 1 to 1.4 |

Among the 1-olefin comonomers having 4 to about 10 carbon atoms the most preferred comonomers are presently 1-butene, 1-hexene, 4-methyl-1-pentene and 1-octene. Combinations of two or more of these comonomers can be used in the process of this invention.

The gas phase used in the polymerization step can contain other components. Diluent gases such as nitrogen or noble gases can be utilized. It is presently preferred, however, to carry out the polymerization step in the catalytic polymerization zone using a gas phase consisting essentially of the 1-olefins defined above, i.e.

ethylene and the comonomer or comonomers, and hydrogen when employed. For melt index and molecular weight control it is presently preferred to carry out the polymerization step in the presence of hydrogen. In addition to increasing the melt index of the polymer added hydrogen also functions to increase the reaction rate of polymerization in the process of this invention.

The gas phase polymerization step of this invention is usually conducted at significant ethylene pressures which are above atmospheric pressure. Usually the pressure in the catalytic polymerization zone is in the range of 50 to 1000 psig, preferably in the range of 100 to 500 psig. Ethylene partial pressure is generally in the range of 50 to 1000 psig and preferably in the range of 100 to 500 psig. If hydrogen is used for molecular weight control the partial pressure of the hydrogen will be in the range of 10 to 150 psig.

The polymerization is carried out at a temperature which can vary widely. An upper limit for the temperature in the polymerization zone is set only by the temperature at which the polymer begins to fuse, causing agglomeration of the polymer particles and loss of catalyst fluidization. The upper temperature limit varies from about 120° C. for ethylene homopolymer to about 90° C. for copolymers of 0.920 g/cc density. Copolymers have lower temperatures of fusion than homopolymers.

The cooling of the catalytic reaction zone can be accomplished by various means including indirect heat exchange or evaporation of a hydrocarbon spray. It is presently preferred to use the ambient feedstream temperature created as the gas stream flows into the catalytic polymerization zone. In view of the fact that the concentration of the comonomer in accordance with this invention can be low, it is possible to operate with relatively low feedstream temperatures. Generally the feed temperature will be in a range of about 25° to 60° C. and the outlet temperature, i.e., the temperature of the gas leaving the catalytic polymerization zone, will be in a range of about 70° to 120° C. For copolymers in particular, the outlet temperatures will be generally below 100° C. It is presently preferred that the temperature difference between the inlet and the outlet temperature of the catalytic reaction zone be in a range of 20° to 60° C.

The gas phase polymerization step of this invention is preferably carried out in a fluidized bed reactor. The catalyst can be fluidized by the gas passing upwardly through a distribution plate and into the catalytic polymerization zone containing the catalyst and the polymer formed. The actual linear velocity of the gas can range from about 0.5 to 5 ft/sec as measured at the reaction conditions employed. It is, however, equally effective to achieve the fluidization by mechanical means. Thus powdered catalyst and finely divided polymer can be fluidized by a stirring or agitating mechanism such as a marine type propeller or an anchor type mixer. When ethylene gas flow is used for the fluidization, the conversion per pass is usually kept low and the gas carries most of the heat of reaction from the reaction zone. This gas is cooled before recycle. It is also possible in accordance with this invention to use mechanical agitation in an autoclave and to actually internally circulate ethylene, and to remove the heat of reaction by transferring this heat to internal walls or cooling plates or coils.

If required the polymer can be separated from the catalyst particles by standard techniques such as by dissolution in a hot solvent such as cyclohexane and filtration or centrifugation of the solution to remove catalyst. The polymer is then recovered by removal of the solvent such as by evaporation or steam stripping as known in the art. If the productivity of the catalyst utilized is sufficiently high, e.g., at least 2000 g polymer per g catalyst, it is also within the scope of this invention to recover and utilize the polymer without separating catalyst residues.

ETHYLENE/1-HEXENE COPOLYMER

Another embodiment of this invention resides in a new ethylene/1-hexene copolymer. This copolymer is characterized by a relative dispersity of the hexene units of 99% or more. The most preferred copolymers of ethylene and 1-hexene have a relative comonomer dispersity of over 100%. These relative dispersities are based on the ideally random distribution as a reference point. Some of the novel copolymers have a dispersion of the comonomers which is better (less clustering) than that of an ideally random dispersed copolymer.

The most preferred copolymer of this invention is characterized in addition to the relative dispersity of the comonomer by the following properties.

| Property | General Range | Preferred Range |
|---|---|---|
| Density[1] (g/cc) | 0.910–0.935 | 0.915–0.930 |
| Melt Index[2] (grams/10 minutes) | 0.6–15 | 1–10 |
| 1-Hexene concentration in the polymer (mole percent) | 0.5–7 | 1–6 |
| Molecular weight[3] | 50–190 | 90–180 |
| Heterogeneity Index[4] (Mw/Mn) | above 6 | 7.5–10 |

[1]ASTM D1505, g/cc.
[2]ASTM D1238, Condition E, g/10 minutes.
[3]Size exclusion chromatography (SEC); weight average in thousands.
[4]Weight average molecular weight divided by number average molecular weight, $M_n$ also determined by SEC.

RELATIVE COMONOMER DISPERSITY

The relative dispersity of the comonomer in the polymer chain, RMD, is defined by the following formula and determined as described below:

$$RMD = \frac{AMD}{BMD}$$

wherein AMD represents the absolute comonomer dispersity and BMD represents the perfectly random comonomer dispersity or Bernoullian dispersity.

The absolute monomer dispersity is determined by the following procedure. The absolute monomer dispersity is defined as the ratio of the number (N) of clusters of comonomers per average molecule divided by the number (X) of comonomer units per average polymer chain. If $n_1$ represents the number of isolated comonomer units, $n_2$ represents an adjacent pair cluster of comonomer units up to a . . . $n_x$ cluster of x contiguous comonomer units present in the copolymer, X and N are defined as follows:

$$X = 1 \cdot n_1 + 2 \cdot n_2 + \ldots + x \cdot n_x = \sum_{i=1}^{i=x} i n_i$$

$$N = n_1 + n_2 + \ldots + n_x = \sum_{i=1}^{i=x} n_i$$

the absolute monomer dispersity is defined by the following relationship:

$$AMD = \frac{N}{X} \cdot 100$$

Thus, if only isolated comonomer units are present in the polymer molecule, AMD would be 100. Conversely, if all comonomer units were concentrated in one block, AMD would be approximately 0.

The ideally random or Bernoullian distribution, BMD, is determined by the following formula:

$$BMD = \frac{N_{Bernoullian}}{X_{Bernoullian}} \cdot 100 = 100 - MC$$

wherein MC is the concentration in mole percent of the comonomer in the polymer. Thus if the polymer consists of 95% ethylene and 5% 1-hexene BMD is 95.

The absolute monomer dispersity AMD is determined by NMR methods as follows:

An NMR spectrum is taken of the polymer. The peaks in accordance with standard NMR practice can be determined and characterized by their position (in ppm) relative to tetramethylsilane. In view of higher operating temperatures the actual "calibration" is done relative to hexamethyldisiloxane having its peak at 2.03 ppm relative to tetramethylsilane. The peaks listed in the following table for the polymer of this invention are given in ppm relative to tetramethylsilane.

The spectrum of the ethylene 1-hexene copolymer will show peaks which have the following assignments:

| Chemical Shift PPM, TMS | Carbon Assignment | Sequence Assignment |
|---|---|---|
| 41.40 | $\alpha\alpha$ | HHHH |
| 40.86 | $\alpha\alpha$ | HHHE |
| 40.18 | $\alpha\alpha$ | EHHE |
| 38.13 | Methine | EHE |
| 35.85 | Methine | EHH |
| 35.37 | 4B$_4$ | HHH |
|  | $\alpha\gamma$ | HHEH |
| 35.00 | $\alpha\gamma$ | EHEH |
|  | $\alpha\delta+$ | HHEE |
| 34.90 | 4B$_4$ | HHE |
| 34.54 | $\alpha\delta+$ | EHEE |
| 34.13 | 4B$_4$ | EHE |
| 33.57 | Methine | HHH |
| 30.94 | $\gamma\gamma$ | HEEH |
| 30.47 | $\gamma\delta+$ | HEEE |
| 29.98 | $\delta+\delta+$ | (EEE)$_n$ |
| 29.51 | 3B$_4$ | EHE |
| 29.34 | 3B$_4$ | EHH |
| 29.18 | 3B$_4$ | HHH |
| 27.28 | $\beta\delta+$ | EHEE |
| 27.09 | $\beta\delta+$ | HHEE |
| 24.53 | $\beta\beta$ | EHEHE |
| 24.39 | $\beta\beta$ | EHEHH |
| 24.25 | $\beta\beta$ | HHEHH |
| 23.37 | 2B$_4$ | EHE + EHH + HHH |
| 14.12 | 1B$_4$ | EHE + EHH + HHH |

In this table the abbreviations $\alpha$, $\beta$, $\gamma$, $\delta+$, 1B$_4$, 2B$_4$, 3B$_4$, 4B$_4$, and methine are used in the usual way well known in NMR technology for the characterization of the relative position of carbon atoms in the polymer chain. The Greek letters refer to a distance in carbon atoms of 1 (for $\alpha$), 2 (for $\beta$) ... 4 or more (for $\delta+$) from the respective methylene carbon atom from a branch site. The terms 2B$_4$ etc. refer to the position of a carbon atom in a side chain, the subscript of B characterizing the length of the side chain which in the case of butyl is always 4 while the prescript characterizes the number of the carbon atom investigated starting with the methyl carbon as "1"; thus the methyl carbon is 1B$_4$. "Methine" characterizes the carbon atom to which the branch is attached and can only be one of three types, EXE, EXX and XXX.

The triad distribution is determined. Although this represents only one of several possibilities, it is presently preferred to use the triad distribution to determine the absolute monomer dispersity. Other methods developed analogously to the triad distribution would be to use either a dyad or tetrad distribution. These other methods do not have as many of the advantages with respect to accuracy or ease of calculation as does the triad distribution. The triad distribution in essence determines the relative concentration of EXE, EXX, XXX contiguous sequences in the polymer molecule where E stands for ethylene and X stands for the comonomer unit, here in particular 1-hexene. For more details reference is specifically made to Eric T. Hsieh and James C. Randall, Ethylene-1-Butene Copolymers 1. Comonomer Sequence Distribution, *Macromolecules*, 15, (2), 353 (1982). Reference is also made to standard NMR techniques for measuring both the peak height and the peak areas, although the latter measurement is preferred.

Since every cluster of two or more X units will contribute to two EXX units, the following relationships exist:

$$EXE = n_1$$

$$EXX = 2(n_2 + n_3 + \ldots + n_i + \ldots)$$

or combining these equations $$EXE + \tfrac{1}{2} \cdot EXX = n_1 + n_2 + n_3 + \ldots + n_i + \ldots = N$$

Similarly, since the triad XXX is found once in XXX, twice in XXXX, three times in XXXXX, etc. the relationship $$XXX = n_3 + 2n_4 + 3n_5 + \ldots (i-2)n_i + \ldots$$

Combining the last three questions one finds readily $$EXE + EXX + XXX = n_1 + 2n_2 + 3n_3 + \ldots + i \cdot n_i \ldots$$
$$= X$$

Thus the absolute monomer dispersity is determined by this NMR evaluation as $$AMD = \frac{N}{X} \cdot 100 = \frac{EXE + \tfrac{1}{2} \cdot EXX}{EXE + EXX + XXX} \cdot 100$$

The individual concentrations of EXE, EXX and XXX being determined from the peak heights or peak areas. In this instance H represents 1-hexene replacing X of the above generic description.

From the so determined value (AMD) for the absolute monomer dispersity, the relative monomer dispersity is determined in accordance with the above formula. In the ensuing discussions the relative and absolute monomer dispersities shown have been determined as described above.

The following examples are intended to further illustrate preferred embodiment of this invention without undo limitation of its scope.

EXAMPLE I

Ethylene/1-Olefin Copolymers

The catalyst used in each run was prepared in the general method disclosed in U.S. Pat. No. 3,887,494 where titanyl sulfate and chromic nitrate were added to an aqueous sulfuric acid solution and the mixture was treated with an aqueous sodium silicate solution to form a tergel hydrogel containing about 8 to 10 weight percent solids. The resulting hydrogel was aged and washed as described in the reference. Water was removed from the hydrogel by azeotrope distillation with 1-hexanol as noted in U.S. Pat. No. 4,081,407. The dried composition was activated (calcined) in a fluidized bed in an oxygen-containing ambient at an elevated temperature, e.g., 5 hours at 870° C. or the temperature specified, to form an active catalyst for ethylene (co) polymerization. Such a tergel catalyst typically contains 1 weight percent Cr present as chromium oxide, 2.5 weight percent Ti present as $TiO_2$ with the balance being a large pore silica, all based on the weight of calcined catalyst, and having a pore volume of about 2.3 cc/g. By large pore silica is meant one having a pore volume greater than 1.7 cc/g as determined by nitrogen adsorption.

Polymerization was conducted in a 2-liter stainless steel jacketed autoclave equipped with a marine-type propeller rotating at 350 RPM using the specified reactor temperature, ethylene pressure, hydrogen pressure, if used, and 1-butene concentration. As ethylene was consumed, it was supplied automatically to the reactor through a calibrated rotameter from a pressurized reservoir. The comonomer concentration in the reactor was maintained at a relatively constant amount by frequently analyzing a sample of the reactor contents by gas chromatography and supplying additional comonomer as required.

During start-up and with the reactor preheated, a small amount of weighed catalyst (usually about 0.02 to 0.04 g) was charged to the reactor before ethylene gas was brought in to provide the desired pressure. When hydrogen was employed, the ethylene flow was temporarily interrupted at a pressure lower than the desired pressure. Hydrogen was then charged at a specified pressure and the system was then pressured up with ethylene to provide the final desired pressure. 1-butene (or other comonomer) was then pumped in to give the desired concentration in the reactor with the actual concentration determined by gas chromatography on a reactor sample. After an induction period of a few minutes polymerization began, as evidenced by ethylene flow through the rotameter. The heat of polymerization was removed by running a cooling liquid through the jacketed autoclave at a rate sufficient to maintain the desired reaction temperature. Polymerization was conducted until the polymer content in the reactor reached the desired level, usually about 4,000 g. polymer per g catalyst as calculated from ethylene and comonomer consumption. At that time, gaseous reactor contents were vented, heating was discontinued, and the reaction stopped. The uniform granular polymer was removed by opening the autoclave.

The reactor conditions employed and the results obtained are presented in Tables IA, IB, IC and ID. Polymer yield is expressed in terms of g polymer per g catalyst (g/g) and average g polymer per g catalyst per hour (ave g/g/hr).

TABLE IA

Ethylene/1-butene Copolymerization

| Run No. | Reaction Temp. °C. | $H_2$ PSI | Reactor Pressure PSIG $H_2 + C_2H_4$ | Ave. 1-Butene Conc.[d] mole % | Reaction Time, Minutes IND[a] | Reaction Time, Minutes Polym. | Polymer Yield g/g | Polymer Yield g/g/hr. ave. | Polymer Properties M.I. g/10 min. | Polymer Properties Density g/cc |
|---|---|---|---|---|---|---|---|---|---|---|
| 1 | 81.6 | 0 | 150 | 4.1 | 20 | 60 | 3850 | 3850 | 1.2 | 0.9300 |
| 2 | 81.6 | 0 | 150 | 5.2 | 15 | 65 | 4140 | 3820 | 2.4 | 0.9208 |
| 3 | 81.6 | 0 | 150 | 6.1 | 10 | 80 | 3820 | 2860 | 4.5 | 0.9153 |
| 4 | 82.6 | 0 | 150 | 5.8 | 25 | 70 | 4080 | 3500 | 2.4 | 0.9195 |
| 5 | 83.0 | 0 | 150 | 4.2 | 10 | 60 | 3840 | 3840 | 2.2 | 0.9260 |
| 6 | 83.9 | 0 | 150 | 3.9 | 30 | 65 | 4420 | 4080 | 1.0 | 0.9286 |
| 7 | 84.4 | 0 | 150 | 5.1 | 20 | 80 | 4240 | 3180 | 5.6 | 0.9154 |
| 8 | 84.9 | 0 | 150 | 3.3 | 10 | 55 | 4070 | 4440 | 1.2 | 0.9285 |
| 9 | 84.9 | 0 | 150 | 4.6 | 15 | 55 | 3970 | 4330 | 2.0 | 0.9274 |
| 10 | 84.9 | 0 | 150 | 6.0 | 20 | 65 | 4080 | 3770 | 4.8 | 0.9241 |
| 11 | 85.0 | 0 | 150 | 4.2 | 30 | 70 | 4890 | 4140 | 4.3 | 0.9266 |
| 12 | 85.1 | 0 | 150 | 4.6 | 30 | 80 | 3920 | 2940 | 2.9 | 0.9262 |
| 13 | 85.1 | 0 | 150 | 4.8 | 25 | 70 | 3780 | 3240 | 3.6 | 0.9224 |
| 14 | 86.4 | 0 | 150 | 4.0 | 15 | 55 | 4080 | 4450 | 3.0 | 0.9250 |
| 15 | 82.5 | 10 | 160 | 4.8 | 10 | 50 | 3420 | 4100 | 1.1 | 0.9288 |
| 16 | 83.4 | 10 | 160 | 4.1 | 15 | 52 | 4470 | 5150 | 2.8 | 0.9292 |
| 17 | 83.5 | 20 | 170 | 4.3 | 10 | 55 | 4300 | 4690 | 1.9 | 0.9294 |
| 18 | 81.9 | 30 | 180 | 5.4 | 15 | 50 | 4030 | 4840 | 2.4 | 0.9262 |
| 19 | 82.8 | 30 | 180 | 5.3 | 10 | 60 | 4030 | 4030 | 4.1 | 0.9282 |
| 20 | 84.0 | 30 | 180 | 4.5 | 70 | 75 | 5140 | 4110 | 2.9 | 0.9234 |
| 21 | 84.9 | 30 | 180 | 4.9 | 20 | 70 | 4260 | 3650 | 6.2 | 0.9236 |
| 22 | 85.0 | 30 | 180 | 3.6 | 30 | 60 | 4810 | 4810 | 2.0 | 0.9316 |
| 23 | 80.2 | 40 | 190 | 3.7 | 20 | 55 | 4440 | 4850 | 0.8 | 0.9306 |
| 24 | 82.9 | 40 | 190 | 4.8 | 40 | 70 | 3800 | 3260 | 4.1 | 0.9224 |
| 25 | 83.4 | 40 | 190 | 4.3 | 15 | 45 | 4050 | 5400 | 3.4 | 0.9288 |
| 26 | 84.2 | 40 | 190 | 4.9 | 20 | 70 | 4360 | 3740 | 5.3 | 0.9200 |
| 27 | 84.5 | 40 | 190 | 3.6 | 20 | 50 | 4120 | 4940 | 2.8 | 0.9330 |
| 28 | 84.4 | 50 | 200 | 4.6 | 35 | 50 | 4010 | 4820 | 4.7 | 0.9212 |
| 29 | 85.0 | 50 | 200 | 4.9 | 35 | 60 | 4270 | 4270 | 6.5 | 0.9265 |
| 30 | 84.0 | 100 | 250 | 5.5 | 28 | 60 | 5290 | 5290 | 5.2 | 0.9238 |
| 31 | 84.7 | 100 | 250 | 3.2 | 37 | 70 | 5900 | 5060 | 5.7 | 0.9294 |
| 32 | 83.5 | 150 | 300 | 4.8 | 35 | 60 | 6470 | 6470 | 2.5 | 0.9294 |
| 33 | 85.0 | 150 | 300 | 5.6 | 25 | 55 | 4060 | 4430 | 6.9 | 0.9222 |
| 34[b] | 84.0 | 0 | 150 | 5.0 | 25 | 130 | 3830 | 1770 | 0.6 | 0.9222 |

TABLE IA-continued

Ethylene/1-butene Copolymerization

| Run No. | Reaction Temp. °C. | H$_2$ PSI | Reactor Pressure PSIG H$_2$ + C$_2$H$_4$ | Ave. 1-Butene Conc.[d] mole % | Reaction Time, Minutes IND[a] | Reaction Time, Minutes Polym. | Polymer Yield g/g | Polymer Yield g/g/hr. ave. | Polymer Properties M.I. g/10 min. | Polymer Properties Density g/cc |
|---|---|---|---|---|---|---|---|---|---|---|
| 35[b] | 84.6 | 0 | 150 | 5.6 | 35 | 100 | 3350 | 2010 | 1.6 | 0.9166 |
| 36[c] | 83.0 | 40 | 190 | 5.4 | 40 | 120 | 3980 | 2000 | 0.70 | 0.9290 |
| 37[c] | 84.7 | 40 | 190 | 5.1 | 65 | 110 | 4340 | 2370 | 0.74 | 0.9264 |

Notes:
[a]Induction
[b]Catalyst activated 4 hours at 650° C.
[c]Catalyst activated 4 hours at 700° C.
[d]Mole % of total olefin present

TABLE IB

Ethylene/1-Hexene Copolymerization

| Run No. | Temp °C. Catalyst Activation | Temp °C. Reactor | Reactor Pressure H$_2$/total | Ave. 1-Hexene Conc. mole % | Reaction Time, Minutes Ind. | Reaction Time, Minutes Polym. | Polymer Yield g/g | Polymer Yield g/g/hr. ave. | Polymer Properties M.I. g/10 min. | Polymer Properties Density g/cc |
|---|---|---|---|---|---|---|---|---|---|---|
| 38 | 760 | 81 | 50/250 | 3.2 | 15 | 110 | 4090 | 2230 | 2.2 | 0.915 |
| 39 | 760 | 82 | 50/250 | 2.7 | 35 | 110 | 3540 | 1930 | 2.2 | 0.9194 |
| 40 | 760 | 81 | 50/250 | 2.0 | 20 | 90 | 3680 | 2450 | 1.0 | 0.9239 |
| 41 | 760 | 81 | 50/250 | 1.9 | 15 | 60 | 4220 | 4220 | 0.66 | 0.9292 |
| 42 | 760 | 85 | 50/250 | 1.7 | 35 | 100 | 4340 | 2600 | 1.4 | 0.9292 |
| 43 | 800 | 83 | 50/250 | 2.5 | 20 | 80 | 4070 | 3050 | 2.7 | 0.9200 |
| 44 | 800 | 85 | 50/200 | 2.0 | 30 | 110 | 4560 | 2490 | 3.0 | 0.9210 |
| 45 | 800 | 83 | 50/250 | 1.8 | 45 | 110 | 4380 | 2390 | 0.8 | 0.9290 |
| 46 | 800 | 82 | 50/250 | 2.1 | 15 | 115 | 4030 | 2100 | 0.8 | 0.9302 |
| 47 | 870 | 85 | 0/200 | 3.0 | 30 | 120 | 4470 | 2240 | 0.96 | 0.9190 |
| 48 | 870 | 85 | 25/200 | 1.7 | 20 | 79 | 3780 | 2870 | 2.4 | 0.9215 |
| 49 | 870 | 84 | 25/200 | 1.9 | 15 | 79 | 4340 | 3300 | 1.5 | 0.9220 |
| 50 | 870 | 86 | 25/200 | 1.8 | 15 | 66 | 4220 | 3840 | 2.2 | 0.9228 |
| 51 | 870 | 85 | 25/200 | 1.7 | 30 | 92 | 4170 | 2720 | 1.2 | 0.9251 |
| 52 | 870 | 85 | 25/200 | 1.6 | 15 | 60 | 3810 | 3810 | 2.0 | 0.9260 |
| 53 | 870 | 85 | 50/200 | 1.8 | 13 | 60 | 4020 | 4020 | 2.2 | 0.9302 |
| 54 | 870 | 91 | 50/225 | 1.2 | 5 | 60 | 3800 | 3800 | 3.4 | 0.9335 |
| 55 | 870 | 85 | 25/200 | 1.1 | 35 | 76 | 4440 | 3500 | 0.88 | 0.9354 |
| 56 | 870 | 95 | 50/225 | 0.96 | 15 | 50 | 5030 | 6040 | 3.6 | 0.9358 |
| 57 | 870 | 92 | 50/225 | 0.78 | 20 | 48 | 5490 | 6850 | 3.5 | 0.9388 |
| 58 | 870 | 95 | 50/225 | 0.37 | 10 | 50 | 3670 | 4400 | 1.4 | 0.9454 |
| 59 | 870 | 95 | 50/225 | 0.26 | 20 | 50 | 3140 | 3770 | 0.94 | 0.9478 |
| 60 | 870 | 106 | 50/400 | 0.12 | 10 | 65 | 3720 | 3430 | 3.0 | 0.9540 |

TABLE IC

Ethylene/1-Hexene Copolymerization
Use of Metal Alkyl Promoter Tergel Activated at 870° C. Polymerization at 85° C.

| Run No. | Metal Alkyl Type | Metal Alkyl Wt. %[a] | Reactor Pressure H$_2$/total | Ave. 1-Hexene Conc. mole % | Reaction Time, Minutes Ind. | Reaction Time, Minutes Polym. | Polymer Yield g/g | Polymer Yield g/g/hr. ave. | Polymer Properties M.I. g/10 min. | Polymer Properties Density g/cc |
|---|---|---|---|---|---|---|---|---|---|---|
| 62 | None | 0 | 50/200 | 1.7 | 15 | 75 | 4190 | 3350 | 7.0 | 0.9254 |
| 63 | (C$_2$H$_5$)$_3$Al | 1.8 | 50/200 | 1.7 | 15 | 80 | 4440 | 3330 | 3.6 | 0.9290 |
| 64 | (C$_2$H$_5$)$_3$Al | 2.9 | 50/200 | 1.6 | 21 | 50 | 4440 | 5330 | 2.0 | 0.9288 |
| 65 | (C$_2$H$_5$)$_3$Al | 3.5 | 50/200 | 1.4 | 11 | 40 | 3930 | 5900 | 1.9 | 0.9302 |

Conclusion:
(C$_2$H$_5$)$_3$Al (above 1.8%) caused an increased reaction rate but decreased melt index and a decreased incorporation of 1-hexene.
[a]Based on catalyst weight.

TABLE ID

Ethylene/4-Methyl-1-Pentene Copolymerization

| Run No. | Reactor Temp. °C. | H$_2$ PSI | Reactor Pressure PSIG H$_2$ + C$_2$H$_4$ | 4-M-1-P[a] Ave. Mole % | Reaction Time, Minutes Ind. | Reaction Time, Minutes Polym. | Polymer Yield g/g | Polymer Yield g/g/hr. ave. | Polymer Properties M.I. g/10 min. | Polymer Properties Density g/cc |
|---|---|---|---|---|---|---|---|---|---|---|
| 66 | 85 | 25 | 200 | 2.5 | 5 | 65 | 3370 | 3110 | 3.2 | 0.9216 |
| 67 | 85 | 25 | 200 | 2.7 | 15 | 68 | 4140 | 3650 | 1.3 | 0.9238 |
| 68 | 85 | 25 | 200 | 2.3 | 10 | 86 | 3650 | 2740 | 1.7 | 0.9260 |
| 69 | 84 | 50 | 200 | 2.5 | 25 | 90 | 3570 | 2380 | 0.96 | 0.9278 |
| 70 | 84 | 50 | 200 | 2.0 | 25 | 79 | 4040 | 3070 | 1.3 | 0.9312 |
| 71 | 84 | 50 | 200 | 1.7 | 30 | 70 | 4350 | 3720 | 0.60 | 0.9360 |
| 72 | 80 | 50 | 225 | 2.8 | 15 | 90 | 3650 | 2430 | 1.1 | 0.9246 |

TABLE ID-continued

Ethylene/4-Methyl-1-Pentene Copolymerization

| Run No. | Reactor Temp. °C. | H$_2$ PSI | Reactor Pressure PSIG H$_2$ + C$_2$H$_4$ | 4-M-1-P[a] Ave. Mole % | Reaction Time, Minutes Ind. | Reaction Time, Minutes Polym. | Polymer Yield g/g | Polymer Yield g/g/hr. ave. | Polymer Properties M.I. g/10 min. | Polymer Properties Density g/cc |
|---|---|---|---|---|---|---|---|---|---|---|
| 73 | 85 | 50 | 225 | 2.2 | 15 | 77 | 4630 | 3610 | 0.44 | 0.9305 |
| 74 | 85 | 50 | 225 | 2.7 | 35 | 86 | 4510 | 3140 | 0.93 | 0.9280 |
| 75 | 85 | 50 | 225 | 2.7 | 35 | 76 | 4160 | 3280 | 1.2 | 0.9254 |
| 76 | 90 | 50 | 225 | 1.7 | 30 | 79 | 4560 | 3460 | 1.1 | 0.9324 |
| 77 | 91 | 50 | 225 | 1.5 | 25 | 70 | 4480 | 3840 | 1.4 | 0.9350 |
| 78 | 94 | 50 | 225 | 1.2 | 30 | 76 | 4100 | 3230 | 2.4 | 0.9368 |
| 79 | 95 | 50 | 225 | 1.0 | 15 | 50 | 4490 | 5380 | 1.9 | 0.9392 |
| 80 | 95 | 50 | 225 | 0.71 | 25 | 66 | 4401 | 4010 | 1.1 | 0.9432 |
| 81 | 100 | 50 | 225 | 0.60 | 5 | 63 | 4480 | 4270 | 28 | 0.9446 |
| 82 | 99 | 50 | 225 | 0.52 | 35 | 60 | 3850 | 3850 | 3.3 | 0.9450 |
| 83 | 100 | 50 | 225 | 0.51 | 25 | 70 | 4120 | 3530 | 2.6 | 0.9456 |
|  | 100 | 50 | 225 | 0.28 | 35 | 77 | 4250 | 3310 | 1.5 | 0.9493 |
| 84 | 100 | 50 | 225 | 0.29 | 20 | 67 | 4190 | 3750 | 1.4 | 0.9496 |

[a]4-methyl-1-pentene

The results in Tables IA, IB, IC and ID demonstrate that copolymers having a wide range of melt indexes, e.g. about 0.6 to 7 and densities ranging from about 0.915 to 0.955 can be made by manipulating the reactor temperature from about 81° to 106° C., the reactor pressure (total, ethylene+hydrogen, (if employed), from about 150 to 400 psig and concentration of comonomer from about 0.1 to 6 mole percent in the gaseous feed. The hydrogen employed varied from 0 to 150 psi.

The data in Table IA show that the presence of hydrogen increases copolymer melt index, increases reaction rate (catalyst activity) as reflected by g polymer per g catalyst per hour, and decreases incorporation of 1-butene into the copolymer structure. The results also show that increasing catalyst activation temperature increases catalyst activity as well as increasing polymer melt index and generally improves incorporation of 1-butene.

EXAMPLE II

Effect of Catalyst Type on Copolymerization

A series of catalysts was prepared as described below, each catalyst containing 1 weight percent Cr present (as chromium oxide) based on the weight of the calcined (activated) catalyst.

Catalyst A, invention tergel catalyst prepared as previously described in Example I and activated for 5 hours as shown in Example I.

Catalyst B, control, large pore silica prepared as disclosed in U.S. Pat. No. 3,900,457. Titanium was absent from this catalyst.

Catalyst C, control. Same catalyst as B except that it was impregnated with a hydrocarbon solution of titanium isopropoxide sufficient to provide about 2.5 weight percent titanium as TiO$_2$ based on the weight of the calcined catalyst.

Catalyst D, control. Commercially available microspheroidal intermediate density silica (Davison 952 MSID silica having a pore volume of 1.6 cc/g), titanated by evaporating titanium isopropoxide onto fluidized catalyst, to contain about 2.5 weight percent titanium present as TiO$_2$ based on the weight of the calcined catalyst.

Each catalyst was employed in the gas-phase polymerization of ethylene and 1-hexene in the manner previously detailed.

Catalyst A was employed also in the gas-phase polymerization of ethylene and 1-butene as before.

The conditions employed and results obtained are given in Tables IIA and IIB. The concentration of 1-butene or 1-hexene in the copolymers (mole % 1-butene or 1-hexene) and the % isolated C$_4$ branches incorporated in the polymer chain was determined from $^{13}$C nuclear magnetic resonance as known in the art. (For example, see E. T. Hsieh and J. C. Randall, "Ethylene-1-Butene Copolymers, I. Comonomer Sequence Distribution", *Macromolecules*, 15, (2), 353 (1982)).

TABLE IIA

Effect of Catalyst Type Used in Ethylene/1-Hexene Copolymerization

| Run No. | Catalyst Type | Catalyst Activation Temp. °C. | Reactor Temp. °C. | Pressures H$_2$ (psi) | Pressures Total (psig) | Mole % 1-Hexene in reactor | Mole % 1-Hexene in copolymer | Polymer Yield g/g/hr. | Polymer Properties M.I. | Polymer Properties Density | 1-Hexene Dispersity Absolute % | 1-Hexene Dispersity Relative % |
|---|---|---|---|---|---|---|---|---|---|---|---|---|
| 1 | A | 800 | 85 | 50 | 200 | 2.04 | 3.8[d] | 2490 | 3.0 | 0.9228 |  |  |
| 2 | A | 870 | 86 | 25 | " | 1.78 | 3.8[d] | 3840 | 2.1 | 0.9228 |  |  |
| 3 | B | " | " | " | " | 1.46 | 2.49[a] | 1590 | 0.28 | 0.9250 | 98.22 | 100.73 |
| 4 | " | " | 87 | " | " | 1.36 | 2.8[d] | 1860 | 0.35 | 0.9281 |  |  |
| 5 | C | " | " | " | " | 1.36 | 3.18[b] | 980 | 12 | 0.9254 | 98.08 | 101.30 |
| 6 | D | 800 | " | " | " | 1.79 | 2.6[d] | 2530 | 0.42 | 0.9292 |  |  |
| 7 | " | " | " | " | " | 1.76 | 2.56[c] | 2660 | 0.36 | 0.9291 | 97.75 | 100.32 |

[a]Weight average molecular weight of polymer of 132,000; number average molecular weight of 17,500; HI of 7.5
[b]Weight average molecular weight of polymer 62,200; number average molecular weight of 7,800; HI of 8.0.
[c]Weight average molecular weight of polymer 95,600; number average molecular weight of 10,300; HI of 9.3 .
[d]From a curve relating density to comonomer concentration in the polymer.

TABLE IIB

Ethylene/1-Butene Gas Phase Copolymerization Tergel Catalyst Activated at 870° C.

| Run No. | 29[1] | 30[1] |
|---|---|---|
| Pressure, psig H$_2$/Total | 100/250 | 50/200 |
| Density | 0.9238 | 0.9265 |
| Melt Index | 5.2 | 6.5 |

TABLE IIB-continued

Ethylene/1-Butene Gas Phase Copolymerization
Tergel Catalyst Activated at 870° C.

| Run No. | 29[1] | 30[1] |
|---|---|---|
| Molecular Weight | | |
| Weight-Average | 67,700 | 67,500 |
| Number-Average | 11,000 | 10,200 |
| HI | 6.1 | 6.6 |
| Reaction Temp., °C. | 84 | 85 |
| Mole % 1-Butene | 3.84 | 3.63 |
| In Copolymer | | |
| Bernoullian Distribution | 96.16 | 96.37 |
| Absolute 1-Butene Dispersity | 88.26 | 92.27 |
| Relative 1-Butene Dispersity | 91.79 | 95.75 |

[1]See Table IA

Inspection of the data in Table IIA reveals that catalyst A (tergel catalyst) used in the invention runs 1, 2 provides the best balance of desirable properties. Thus it combines acceptable polymer yields, polymer melt indexes and relatively low polymer densities showing that the 1-hexene is being efficiently incorporated into the polymer structure. Control catalyst B (large pore silica base, no titanium) has low activity in the process and the resulting copolymers exhibit low melt index values relative to the invention runs. The titanated large pore silica base control catalyst C exhibits an even lower polymerization activity than control catalyst B. However, a high melt index polymer is formed. The titanated MSID silica base control catalyst D possesses acceptable polymerization activity but the resulting polymers are low in melt index and high in density relative to the invention runs. This catalyst does not incorporate 1-butene into the polymer structure as efficiently as does tergel catalyst A. All the catalysts were about equally effective in the dispersion of $C_4$ branches, e.g. above 100%.

The date in Table IIB demonstrate that the dispersion of $C_2$ branches from the 1-butene comonomer is not as good as the results obtained with the $C_4$ branches from the 1-hexane comonomer, e.g. about 92–96% compared to above 100%.

EXAMPLE III

A series of ethylene/1-hexene copolymers and ethylene/4-methyl-1-pentene copolymers were prepared with the tergel catalyst as previously described. The density and percent branches present in the copolymer structure (branching dispersity) was determined for each copolymer. The calculated isolated percent of the branches of random, according to the Bernoullian statistical method are also presented.

The results obtained with the ethylene/1-hexene copolymers are given in Table IIIA. The results obtained with the ethylene/4-methyl-1-pentene copolymers are given in Table IIIB.

In Table IIIC the branching dispersities for several commercial and experimental ethylene/1-olefin copolymers are presented for comparison.

TABLE IIIA

Branching Dispersity in Gas-Phase Ethylene/1-Hexene Copolymers

| Polymer M.I. | Polymer Density | Mole % $1-C_6H_{12}$ in Copolymer | Comonomer Dispersity[a] | | |
|---|---|---|---|---|---|
| | | | Absolute % | Bernoullian % | Relative % |
| 0.6 | 0.9292 | 2.56 | 99.3 | 97.4 | 102.0 |
| 1.8 | 0.9288 | 2.71 | 97.5 | 97.3 | 100.2 |
| 1.2 | 0.9239 | 3.73 | 98.3 | 96.3 | 102.1 |
| 3.0 | 0.9228 | 3.95 | 96.6 | 96.0 | 100.6 |
| 2.2 | 0.9198 | 4.72 | 95.5 | 95.3 | 100.2 |

[a]Calculated by dividing % absolute by % Bernoullian and multiplying by 100.

TABLE IIIB

Branching Dispersity of Gas-Phase Ethylene/4-ME-1-Pentene Copolymers

| Polymer M.I. | Polymer Density | 4-ME-1-Pentene Conc. in Polymer, Mole % | Comonomer Dispersity | | |
|---|---|---|---|---|---|
| | | | Absolute % | Bernoullian % | Relative % |
| 1.3 | 0.9312 | 1.76 | 93.6 | 98.2 | 95.3 |
| 1.7 | 0.9260 | 2.41 | 95.5 | 97.6 | 97.8 |
| 1.3 | 0.9238 | 2.82 | 93.3 | 97.2 | 96.0 |
| 3.2 | 0.9216 | 3.66 | 92.4 | 96.2 | 96.0 |

TABLE IIIC

Branching Dispersity In Various Experimental and Commercial Gas-Phase Ethylene/1-Olefin Copolymers

| Copolymer Source | Density | M.I. | Mole % Comonomer In Copolymer | Comonomer Dispersity | | |
|---|---|---|---|---|---|---|
| | | | | Absolute % | Bernoullian % | Relative % |
| Experimental (1) | 0.9301 | 0.9 | 3.8 (1-butene) | 94.2 | 96.1 | 98.0 |
| Experimental (2) | 0.9209 | 1.8 | 4.7 (1-butene) | 90.5 | 95.4 | 94.9 |
| Experimental (3) | 0.9223 | 0.5 | 4.0 (1-butene) | 83.8 | 96.0 | 87.3 |
| Experimental (4) | 0.935 | 2.6 | 2.8 (1-octene) | 94.5 | 97.2 | 97.2 |

Notes:
(1) Copolymer prepared with an experimental vanadium-containing catalyst (no chromium).
(2) Copolymer sold by Union Carbide.
(3) Copolymer prepared with an experimental titanium-containing catalyst (no chromium).
(4) Copolymer sold by Dow.

EXAMPLE IV

Effect of Comonomer Type on Ethylene/1-Olefin Copolymerization

A series of ethylene/1-olefin copolymers was prepared as described before employing the tergel catalyst in gas-phase copolymerization at a reactor temperature in the range of 81°–85° C., ethylene pressure in the range of 150 to 200 psig and in the presence of about 25–50 psig hydrogen.

The comonomers used and the relative amounts of each to obtain copolymers having about the same density are given in Table IV.

TABLE IV

Gas-Phase Copolymerization at 81–85° C., 150–200 psi $C_2H_4$, $H_2$ added, Tergel Catalyst

| Run No. | α-olefin Comonomer | Copolymer Density | Mole % α-Olefin | |
|---|---|---|---|---|
| | | | in Copolymer | in gas-phase in reactor |
| 30 | 1-butene | 0.9238 | 3.8 | 5.5 |
| 40 | 1-hexene | 0.9239 | 3.7 | 2.4 |
| 67 | 4-ME-1-pentene | 0.9238 | 2.9 | 2.7 |

TABLE IV-continued

Gas-Phase Copolymerization at 81–85° C., 150–200 psi $C_2H_4$, $H_2$ added, Tergel Catalyst

| Run No. | α-olefin Comonomer | Copolymer Density | Mole % α-Olefin in Copolymer | Mole % α-Olefin in gas-phase in reactor |
|---|---|---|---|---|
| 68 | 1-octene | 0.9240 | (3.6)* | 0.6 |

*Estimated based on density.

The data in Table IV demonstrate that the concentration of 1-olefin comonomer in the reactor diminishes significantly from about 5.5 mole percent for 1-butene to about 0.6 mole percent for 1-octene in preparing copolymer having about the same density, 0.924 g/cc. The branched 1-olefin, 4-methyl-1-pentene requires a somewhat higher concentration in the feed, 2.7 mole percent vs. 2.4 mole percent for 1-hexene. However, the amount actually incorporated in the copolymer structure to give about the same density is significantly lower for the branched 1-olefin.

Reasonable variations and modifications which will become apparent to those skilled in the art can be made from this invention without departing from the spirit and scope thereof.

We claim:

1. An ethylene-hexene-1 copolymer having a density of 0.910–0.935 and a relative comonomer dispersity of over 100%.

2. An ethylene-hexene-1 copolymer having a density of 0.910–0.935 and a relative comonomer dispersity of over 100% and a melt index of 1 to 10.

3. A copolymer in accordance with claim 1 containing 1 to 6 mole percent 1-hexene and 99 to 94 mole percent ethylene, said copolymer having a maximum relative comonomer dispersity which is the sum of 100% plus the concentration of 1-hexene in mole percent.

4. A process to produce ethylene-monoolefin copolymers comprising contacting a gas mixture containing ethylene and another monoolefin selected from the group consisting of 1-butene, 1-hexene, 1-octene and 4-methyl-1-pentene with a silica/titania/chromium oxide catalyst, said silica and titania being coprecipitated, under gas phase polymerization conditions in a polymerization zone such as to produce an ethylene-monoolefin-copolymer having a density in the range of 0.915 to 0.935 g/cc wherein said 1-butene, when used, is used in a concentration in mole percent in the gas phase on total olefins in the gas phase in the polymerization zone as 100 mole percent which is defined by the following formula $$CGB = \frac{CPB}{K4}$$

wherein

CGB is the concentration of 1-butene in mole percent in the gas phase,

CPB is the concentration of 1-butene in the copolymer and

K4 is a factor in the range of 0.6 to 1.2;

wherein said 1-hexene, when used, is used in a concentration in mole percent in the gas phase based on total olefins in the gas phase in the polymerization zone as 100 mole percent which is defined by the following formula $$CGH = \frac{CPH}{K6}$$

wherein

CGH is the concentration of 1-hexene in mole percent in the gas phase,

CPH is the concentration of 1-hexane in the copolymer and

K6 is a factor in the range of 1.4 to 2.5;

wherein said 1-octene, when used, is used in a concentration in mole percent in the gas phase based on total olefins in the gas phase in the polymerization zone as 100 mole percent which is defined by the following formula $$CGO = \frac{CPO}{K8}$$

wherein

CGO is the concentration of 1-octene in mole percent in the phase phase,

CPO is the concentration of 1-octene in the copolymer and

K8 is a factor in the range of 4 to 7;

wherein said 4-methyl-1-pentene, when used, is used in a concentration in mole percent in the gas phase based on total olefins in the gas phase in the polymerization zone as 100 mole percent which is defined by the following formula $$CGF = \frac{CPF}{K51}$$

wherein CGF is the concentration of 4-methyl-1-pentene in mole percent in the phase phase, CPF is the concentration of 4-methyl-1-pentene in the copolymer and K51 is a factor in the range of 1 to 1.4;

with the proviso that the higher values of the range of K4 or respectively K6 or respectively K8 or respectively K51 are associated with the lower densities and conversely wherein the lower values of these values K4, K6, K8 or K51 are associated with the higher densities of the copolymer produced.

5. A process in accordance with claim 4 wherein said catalyst is selected from the group consisting of one or more of (a) silica-titania-chromium tergels and (b) chromium supported on silica-titania cogels.

6. Process in accordance with claim 4 wherein said polymerization step is carried out a pressure of about 50 to about 1000 psig and at a temperature below 120° C.

7. Process in accordance with claim 6 wherein the polymerization temperature is in the range of 70° to 95° C.

8. Process in accordance with claim 4 wherein the polymerization is carried out with free hydrogen present in the gas phase of the polymerization zone.

* * * * *

UNITED STATES PATENT AND TRADEMARK OFFICE
CERTIFICATE OF CORRECTION

PATENT NO. : 4,522,987
DATED : June 11, 1985
INVENTOR(S) : John P. Hogan et al.

It is certified that error appears in the above-identified patent and that said Letters Patent are hereby corrected as shown below:

Column 18, line 12, delete "1-hexane" and insert ---1-hexene---;

Column 18, line 25, delete "phase phase" and insert ---gas phase---;

Column 18, line 40, delete "phase phase" and insert ---gas phase---.

Signed and Sealed this

Thirtieth Day of December, 1986

Attest:

DONALD J. QUIGG

Attesting Officer

Commissioner of Patents and Trademarks